Figure 1:
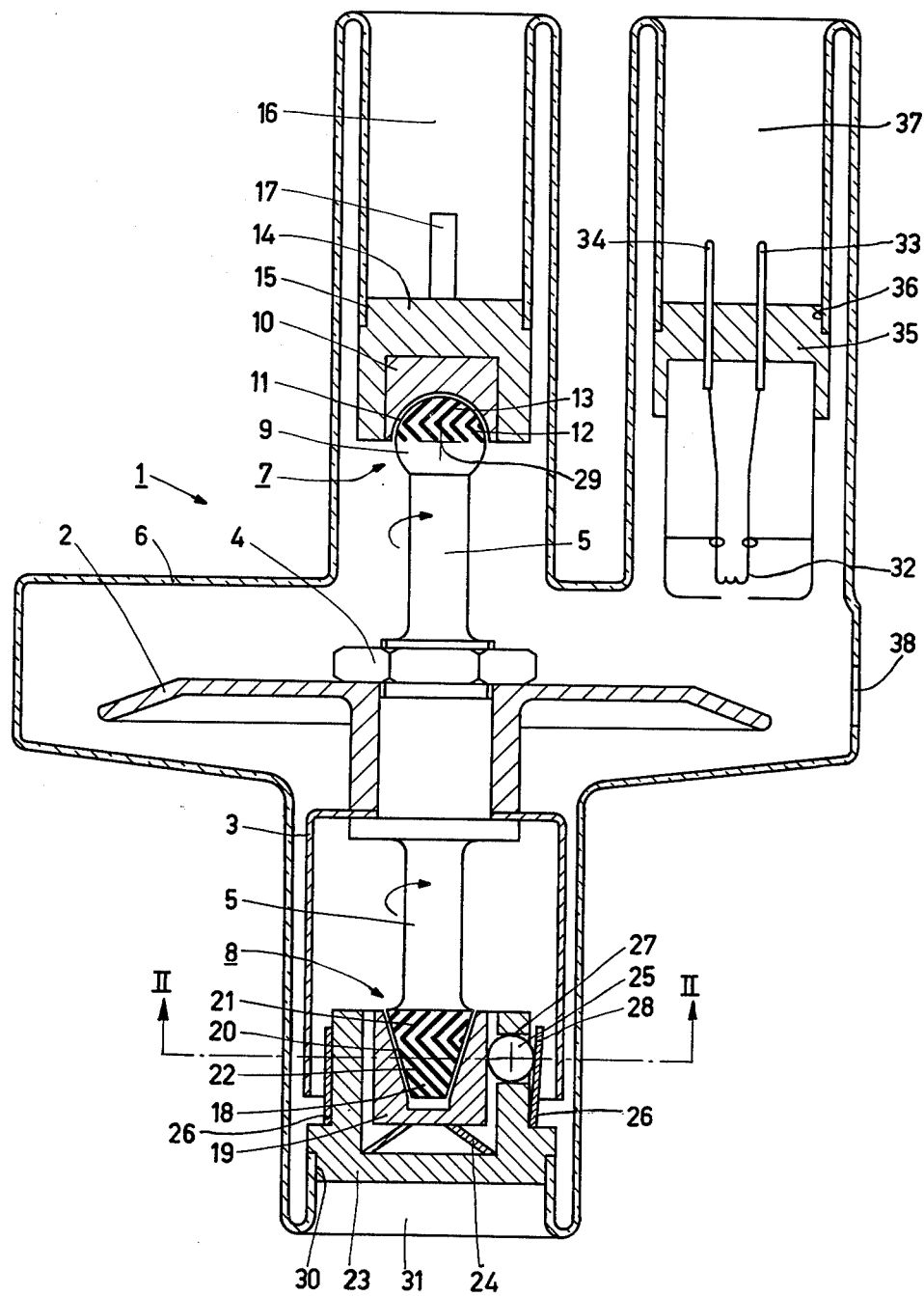

United States Patent [19]

Gerkema et al.

[11] 4,210,371
[45] Jul. 1, 1980

[54] ROTARY-ANODE X-RAY TUBE

[75] Inventors: Jan Gerkema; Everhardus A. Muijderman, both of Eindhoven, Netherlands

[73] Assignee: U.S. Philips Corporation, New York, N.Y.

[21] Appl. No.: 965,111

[22] Filed: Nov. 30, 1978

[30] Foreign Application Priority Data

Dec. 9, 1977 [NL] Netherlands .................. 7713634

[51] Int. Cl.² .................. F16C 3/02; F16C 17/10
[52] U.S. Cl. .................. 308/9; 308/78; 308/172; 308/DIG. 8; 313/60
[58] Field of Search .................. 308/1 R, 9, 72, 168, 308/170, 171, 240, 241, 78, 172, DIG. 8; 313/60, 149

[56] References Cited

U.S. PATENT DOCUMENTS

| 2,293,527 | 8/1942 | Atlee | 308/1 R |
| 3,038,731 | 6/1962 | Milleron | 277/22 |
| 3,602,555 | 8/1971 | Hendler | 308/9 |
| 4,024,424 | 5/1977 | Eggelsmann | 313/60 |
| 4,043,612 | 8/1977 | Orcutt | 308/72 X |
| 4,141,603 | 2/1979 | Remmers et al. | 308/168 X |

Primary Examiner—Frederick R. Schmidt
Attorney, Agent, or Firm—Algy Tamoshunas

[57] ABSTRACT

A rotary-anode X-ray tube, comprising a rotary anode which is journalled in a vacuum-tight housing by means of at least one sleeve bearing whose mutually co-operating bearing surfaces are made of W or Mo or of an alloy of W and Mo. The bearing is lubricated by Ga or a Ga alloy having a melting point below 25° C. The Ga or Ga alloy lubricant is in molecular wetting contact with the bearing surfaces so that the bearing surfaces are completely separated from each other in the loaded condition. During standstill, as well as during rotation, the lubricant is not forced out of the bearing, so that the bearing surfaces cannot become fused. The wear and the bearing noise are therefore extremely low. The desired, thorough wetting is obtained by making the bearing surfaces, as well as the Ga alloy, oxide-free before they are brought into contact with each other.

6 Claims, 6 Drawing Figures

3a

3b

3c

3d

ROTARY-ANODE X-RAY TUBE

The invention relates to a rotary-anode X-ray tube of the type in which the rotary anode is journalled by means of at least one metal lubricated bearing in a vacuum-tight housing.

An X-ray tube of this kind is particularly suitable for use as a radiation source in medical X-ray diagnosis apparatus.

U.S. Pat. No. 2,293,527 describes an X-ray tube of this kind, in which the bearing system comprises two metal lubricated ball bearings. In order to minimize wear of the ball bearings in an X-ray tube of this kind, the anode is rotated only when the X-ray tube emits radiation. In spite of this step, the life of the X-ray tube is short due to the short life of the ball bearings. This is mainly due to the fact that a portion of the heat developed in the anode during operation is dissipated through the bearings, as a consequence of which the temperature of the ball bearings increases to approximately 400° C. Furthermore, the ball bearing must operate in a vacuum. Under such working conditions ball bearings cannot be adequately lubricated, as a further consequence of which it is necessary to use bearings with adequate clearances in order to avoid the risk of seizing up of the bearings. Consequently, the noise of the X-ray tube is substantial, which is very annoying to a patient who is being examined, with the aid of apparatus containing such an X-ray tube.

An object of the invention is to provide an X-ray tube with a long life, and low bearing noise. This is accomplished in the X-ray tube of the invention by the use of a sleeve bearing in which at least the co-operating metal bearing surfaces are not substantially attacked by Ga or a Ga alloy which serves as a lubricant in the sleeve bearing, the Ga-alloy having a melting point below 25° C. and being in a molecular wetting contact with the bearing surfaces. The term molecular-wetting contact as used herein is to be understood as a wetting contact in which there is direct interaction between metal atoms of the bearing surfaces and atoms of the Ga alloy. Such wetting of the bearing surfaces, which are preferably made of W or Mo or of an alloy of W and Mo, by Ga or the Ga alloy is so thorough, that the bearing surfaces are completely separated from each other by the Ga or the Ga alloy in the loaded condition of the bearing in the tube. Both in the stationary state and during rotation of the anode, Ga or the Ga alloy is not forced out of the bearing, so that the bearing is prevented from seizing up and the wear as well as bearing noise are substantially reduced. The rotation of the anode need not be interrupted when radiation is not being emitted by the tube, but may continue for a prolonged period, for example, for a working day, during which period the tube current may be switched on and off at any desired instant. During operation, the tube current as well as the heat developed in the anode by the electron flow incident thereon can be dissipated satisfactorily through the bearing, because Ga or the Ga alloy also has a favourable, electrical and heat conductivity, even at the temperatures and the pressures to which they are subjected in an X-ray tube. Because the temperature of an X-ray tube when in use in an apparatus for medical X-ray diagnosis is at least 25° C., the Ga alloy in the bearing of the X-ray tube, in accordance with the invention, when in use in such an apparatus is in the liquid state, so that starting of rotation of the anode is possible without any problems. When Ga is used as a lubricant in the bearing, the X-ray tube has to be preheated before starting the rotation of the anodes so as to bring the Ga into the liquid state.

A preferred embodiment of an X-ray tube according to the invention is characterized in that at least one of the mutually co-operating bearing surfaces of the sleeve bearing is provided with helical grooves. As a result of the presence of the helical grooves in a bearing surface, lubricant (Ga alloy) is forced into the bearing during operation. As a result, the distribution of the gallium alloy in the bearing is improved and, in addition to increasing the load capacity of the bearing, the bearing thus has a high dynamic stability during rotation.

Figure 2:
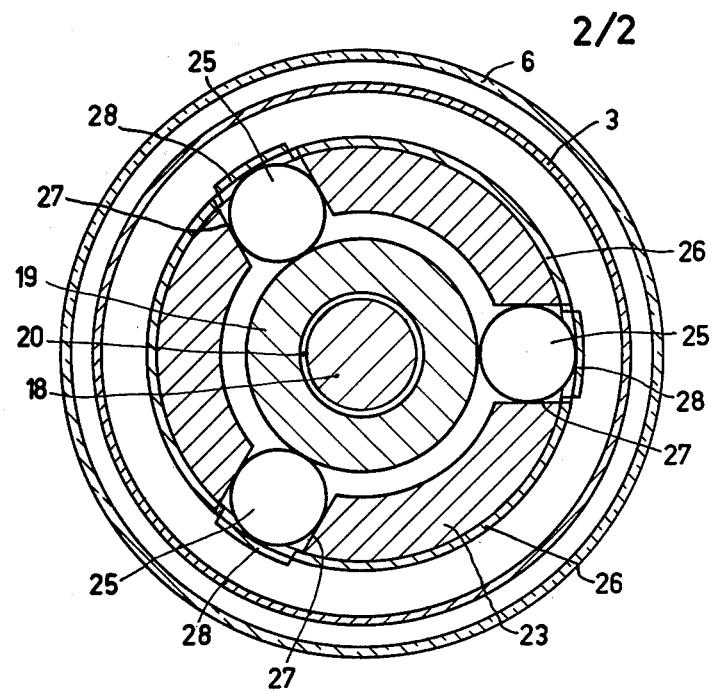

The invention will now be described, by way of example, with reference to the accompanying drawings, in which:

FIG. 1 is a diagrammatic, longitudinal sectional view of a rotary-anode X-ray tube according to the invention, FIG. 2 is a cross-sectional view taken along the line II—II in FIG. 1, and FIGS. 3a, 3b, 3c and 3d diagrammatically show feasible interface configurations upon interaction between a metal surface to be wetted and a Ga alloy having a low melting point and a low vapour pressure.

FIG. 1 shows an X-ray tube comprising a rotary anode 2 which together with a rotor 3 is secured, by means of nut 4, on a shaft 5 rotatably journalled in a vacuum-tight housing 6 by means of two bearings 7 and 8. The bearing 7 has a spherical portion 9 which is rigidly connected to the shaft 5 and is accommodated in a spherical recess in supporting member 10. Opposite faces of the spherical portion 9 and the supporting member 10 form bearing surfaces of the bearing 7 and define a bearing gap 11 therebetween. The bearing gap 11 is filled with a Ga alloy which serves as a lubricant and which molecularly wets the bearing surfaces of the spherical portion 9 and supporting member 10 which are made of Mo so that the spherical portion 9 and supporting member 10 are completely separated from each other in the loaded condition of the bearing 7. The spherical portion 9 is provided with a groove pattern 12 which forces the lubricant in the direction of the sphere most remote from the bearing 8 upon rotation of the shaft 5. The spherical portion 9 is furthermore provided with a second groove pattern 13 whose grooves extend oppositely from those of the groove pattern 12, and thus force lubricant in the other direction. As a result of these groove patterns 12, 13, the bearing 7 has, in addition to an extra high loadability in the radial and the axial directions, a high dynamic stability upon rotation of the shaft 5. The supporting member 10 is mounted in a cylindrical structural member 14 which is mounted by means of a vacuum-tight connection 15 in a bowl-shaped recess 16 in the housing 6. The structural member 14 carries a contact pin 17 for applying the tube current and for dissipating part of the heat developed in the anode 2 during operation of the X-ray tube 1.

The bearing 8 has a conical portion 18 which is rigidly connected to the shaft 5 and is disposed in a conically recessed supporting member 19. The opposed faces of the conical portion 18 and of the supporting member 19 form the bearing surface of the bearing 8 and define a bearing gap 20. The bearing gap 20 is filled with a Ga allow which serves as a lubricant and which molecularly wets the bearing surfaces of the conical portions 18 and of the supporting member 19, which are made of Mo, so that these surfaces are completely separated from each other in the loaded condition of the bearing. The conical portion 18 is provided with two groove patterns 21 and 22 (similar to those of the spherical portion 9) which force the lubricant into the bearing gap 20 in opposite directions. As a result, the bearing 8 has, in addition to an increased loadability in the radial and the axial directions, a high dynamic stability. The supporting member 19 is resiliently mounted in a cylindrical member 23, i.e. in the axial direction by means of a cup spring 24, and in the radial direction by means of three steel balls 25 (see also FIG. 2) and a spring member 26. The balls 25 are located in cylindrical bores 27 in the structural member 23 and are pressed by resilient tongues 28, which are secured to the spring member 26, against the supporting member 19 in the radial direction. The axial resilience obtained by means of the cup spring 24, serves to take up length variations of the shaft 5 due to fluctuating temperatures in the tube. The radial resilience, obtained by means of the resilient member 26, ensures that, in the case of unbalance of the rotary anode 2, the shaft 5 can perform a precessional movement across a conical surface whose apex is situated in the mathemetical centre 29 of the spherical portion 9 of the bearing 7, in order to prevent additional forces on the bearings. The structural member 23 is mounted by means of a vacuum-tight connection 30, in a bowl-shaped recess 31 in the housing 6.

A cathode 32 (shown schematically) is electrically connected to two contact pins 33 and 34 located in a structural member 35 which is secured by means of a vacuum-tight connection 36, in a bowl-shaped recess 37 in the housing 6. The cathode filament voltage is applied between the contact pins 33 and 34, whilst the tube current is discharged via one of these pins. X-radiation generated can emerge from the tube 1 via a window 38.

Suitable Ga alloys for use as lubricants in the bearing gaps 11 and 20 are, for example, the two binary eutectic compositions 76 Ga—24 In and 92 Ga—8 Sn, which melt at 16.5° C. and 20.0° C., respectively (the compositions being expressed in per cent by weight). Also suitable in this respect is the ternary eutectic composition 62 Ga—25 In—13 Sn which melts at 5° C.

Figure 3:
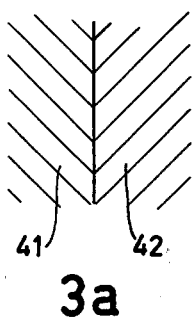
Figure 3:
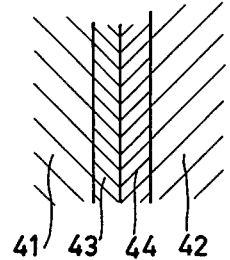
Figure 3:
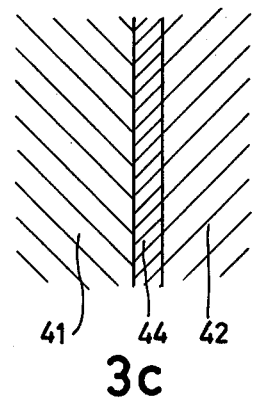
Figure 3:
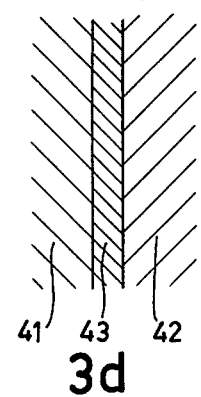

FIG. 3a shows an interface between a metal 41 and a Ga alloy 42. The metal 41 is molecularly wetted by the Ga alloy 42, like in an X-ray tube in accordance with the invention. There is a direct interaction between metal atoms and atoms of the Ga alloy. Preferably, the metal 41 is one of the metals W, Mo, Ta or Nb, because these metals are not attacked by the Ga alloy or only to a limited degree. Metals such as Cu, brass, Fe, stainless steel and Ni are strongly attacked. Components made of these metals, therefore, "swell" when molecularly wetted by a Ga alloy.

FIGS. 3b, 3c and 3d show interfaces between a metal 41 and a Ga alloy 42 without molecular wetting, because an oxide layer is present between these two layers. Wetting of this kind is not suitable for use in a sleeve bearing in an X-ray tube in accordance with the invention, because in the stationary state, as well as during rotation of the tube, the Ga alloy is forced out of the bearings. The bearing surfaces then mechanically contact each other, so that substantial wear occurs during operation and the bearing surfaces are even liable to become fused, so that the bearings seize up.

FIG. 3b shows an interface between a metal 41, covered by a layer of metal oxide 43 and a Ga alloy 42 which is separated from the layer 43 by a layer of oxidized Ga alloy 44. The Ga alloy 42 is not in direct contact with the metal 41. The wetting is mediocre, the layers "adhere" to each other, which appears from the following test. An anodized Al shaft, having a diameter of 20 mm, exhibits the interface configuration shown in FIG. 3b after wetting with a Ga alloy. By means of a ring having an inner diameter which is 10 μm larger than the diameter of the shaft, the Ga alloy is stripped from the shaft. A similar mediocre wetting takes place on surfaces of oxidic materials such as quartz or glass.

FIG. 3c shows an interface between a metal 41 and a Ga alloy 42 which is separated from the layer 41 by a layer of oxidized Ga alloy 44. The Ga alloy 42 is not in direct contact with the metal 41. The wetting is mediocre and comparable to that for the interface configuration shown in FIG. 3b.

FIG. 3d shows an interface between a metal 41, covered with a layer of metaloxide 43, and a Ga alloy 42. In this case no wetting at all occurs. The same is applicable with an oxidic material such as glass or quartz. A glass rod is not wetted by an oxide-free Ga alloy.

The only one of the interface configurations shown in the FIGS. 3a to 3d which is suitable for use in the bearing of an X-ray tube in accordance with the invention is the one shown in FIG. 3a, which can be realized by heating the metal surface 41 and the Ga alloy 42 separately in a reducing atmosphere, for example, in hydrogen, for some time at a temperature of 800° C. Any oxides present are then reduced. When the metal surface and the Ga alloy are subsequently brought into contact with each other in the same reducing atmosphere, possibly at a lower temperature, the metal surface is very well wetted and the interface exhibits the configuration shown in FIG. 3a.

Alternatively, the metal surface 41 can be heated at 800° C. for some time in a reducing atmosphere, for example, hydrogen, after which it is covered in the same reducing atmosphere, possibly at a substantially reduced pressure, by an approximately 1 μm thick Au layer. Because Au does not oxidize in air, the metal surface can be dripped into a molten Ga alloy in air at a substantially lower temperature. Should an oxide layer be present on the Ga alloy, it can be simply removed prior to the dipping, for example, by means of a spatula, with the result that the Au layer is covered by an oxide-free layer of Ga alloy. The Au layer forms a liquid Ga-Au-alloy with Ga, so that the Au effectively dissolves in the Ga alloy deposited by the dipping. Thus, a very good direct contact is formed between the metal surface and the Ga alloy. The Ga-Au alloy represents a contamination in the Ga alloy, but this contamination is only small because the Au layer provided on the metal surface is very thin.

It is to be noted that other sealing outer layers of metals or metal alloys which do not oxidize in air, or only slowly oxidize, may be used in the above-described method of applying a gallium alloy to the bearing surfaces.

What is claimed is:

1. In an X-ray tube having a vacuum-tight housing, a rotary anode and at least one bearing having a first bearing surface on said rotary anode and a second bearing surface cooperating with said first surface to rotatably support said rotary anode in said housing, wherein the improvement comprises a lubricant for lubricating said bearing comprising Ga or a Ga alloy and having a sufficiently low melting point so that said lubricant is in a liquid state at the operating temperature of said bearing wherein said first and second bearing surfaces rotate with respect to each other with a gap therebetween which is filled by the liquid Ga or Ga alloy so that there is no contact between said bearing surfaces even under loaded conditions, at least said cooperating bearing surfaces of said bearing being made from a material substantially resistant to attack by said Ga or Ga alloy and said Ga or Ga alloy being in molecular wetting contact with said bearing surfaces so that said lubricant in said liquid state is contained substantially within said bearing during operation of said tube thereby avoiding contamination of the tube with the lubricant.

2. The tube according to claim 1 wherein said melting point of said Ga alloy is below 25° C.

3. The tube according to claims 1 or 2 wherein said bearing is a sleeve bearing.

4. The tube according to claim 3 wherein said material of said bearing surfaces is a metal selected from the group consisting of W, Mo, and an alloy of W and Mo.

5. The tube according to claim 4 wherein at least one of said bearing surfaces of said bearing is provided with helical grooves.

6. The tube according to claim 5 wherein said grooves are arranged into two groups configured to force said lubricant between said bearing surfaces during rotation of said anode.

* * * * *